(12) United States Patent
Shaw et al.

(10) Patent No.: US 6,247,045 B1
(45) Date of Patent: Jun. 12, 2001

(54) METHOD AND APPARATUS FOR SENDING PRIVATE MESSAGES WITHIN A SINGLE ELECTRONIC MESSAGE

(75) Inventors: Wade David Shaw; Edmund Torche; Martin Keith Wright, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,710

(22) Filed: Jun. 24, 1999

(51) Int. Cl.[7] .......................... G06F 15/16; G06F 15/173
(52) U.S. Cl. .......................... 709/207; 709/206; 709/240
(58) Field of Search .................................. 709/206, 207, 709/246, 240; 379/93.01, 93.02, 93.24, 100.08; 345/113, 150, 329, 330, 331; 707/512, 528, 6

(56) References Cited

U.S. PATENT DOCUMENTS

| | | | |
|---|---|---|---|
| 4,773,009 | * 9/1988 | Kucera et al. | 707/531 |
| 5,276,869 | * 1/1994 | Forrest et al. | 395/600 |
| 5,493,692 | * 2/1996 | Theimer et al. | 455/26.1 |
| 5,623,679 | 4/1997 | Rivette et al. | 395/773 |
| 5,689,805 | * 11/1997 | Ayerst et al. | 45/33.1 |
| 5,742,763 | * 4/1998 | Jones | 709/200 |
| 5,887,133 | * 3/1999 | Brown et al. | 709/200 |
| 5,913,032 | * 6/1999 | Schwartz et al. | 709/213 |
| 5,917,489 | * 6/1999 | Thurlow et al. | 345/347 |
| 5,963,941 | * 10/1999 | Hirakawa | 707/5 |
| 6,044,395 | * 3/2000 | Costales et al. | 709/206 |

OTHER PUBLICATIONS

Freed et al. "MIME Part One: Format of Internet Message Bodies", RFC 2045, Nov. 1996.*
Freed et al., "MIME Part Two: Media Types", RFC 2046, Nov. 1996.*
Moore, K. "MIME Part Three: Message Header Extensions for Non–ASCII Text", RFC 2047, Nov. 1996.*
Freed et al. "MIME Part Four: Registration Procedures", RFC 2048, Nov. 1996.*
Freed et al. "MIME Part Five: Conformance Criteria and Examples", RFC 2049, Nov. 1996.*
Hudson et al. "Electronic Mail Previews Using Non–Speech Audio", ACM CHI '96, pp. 237–238, 1996.*
Harris et al. "Lightweight Object–Oriented Shared Variables for Distributed Applications on the Internet", ACM OOPSLA '98, pp. 296–309, Oct. 1998.*
van der Meer, et al. "An Approach for a 4th Generation Messaging System", Autonomous Decentralized System IEEE '99, pp. 158–167, Mar. 1999.*
Klyne et al. Content Feature Schema for Internet Fax, RFC 2531, Mar. 1999.*

* cited by examiner

Primary Examiner—Mark H. Rinehart
Assistant Examiner—Jason D. Cardone
(74) Attorney, Agent, or Firm—Duke W. Yee; Marilyn Smith Dawkins

(57) ABSTRACT

A method, system, and program for use in a data processing system for sending private messages from a single electronic message. A plurality of recipients is identified for an electronic message. A number of different sections are designated within the electronic message for separate receipt by each of a number of recipients within the plurality of recipients. Responsive to an indication to send the electronic message, an electronic message is automatically generated for each of the number of recipients, wherein the message of a given recipient within the number of recipients excludes sections within the number of sections designated for other recipients within the number of recipients.

26 Claims, 9 Drawing Sheets

▽ Julie Key
12/16/98 04:35PM
* * * * * * * * * * * * * * * * * *

To: Dept
cc: Mike Foster/Dallas/IBM@IBMUS, Douglas Buster/Dallas/IBM@ibmus,
Enrique Gomez/Austin/IBM, David Martin/Almaden/IBM@IBMUS, Vicki Wolf/
Austin/Contr/IBM@IBMUS
From: Julie Key/Austin/IBM@IBMUS
Subject: IM4RM V1.3

I am pleased to announce that IM4RM V1.3 has gone GOLD. It will be shipped to Dallas today so that they can verify and prepare this release for shipment to customers.

If you have questions concerning our release of this product, please let me know.

(Vicki – please forward to whole area) ~602

Julie Key
juliekey@us.ibm.com
IBM Data Mining – SW Dev Mgr, IM4RM

▽ Vicki Wolfe * * * * * * * * * * * * * * * *

To: eg – all
    cc:
    From: Victoria Wolfe/Austin/Contr/IBM@IBMUS
    Subject: IM4RM V1.3

See attached message from Julie Key.

Thanks and have a Great Day,

Victoria Wolfe, t/1678-5660 or outside 512-838-5660
Administrative support to Enrique Gomez Manager, Business Intelligence Solutions
Development and David Martin, Manager Development ------- Forwarded by Victoria Wolfe/Austin/Contr/IBM on 12/16/98 04:41PM ▽ Julie Key
     12/16/98 04:35PM
    * * * * * * * * * * * * * * * * *

To: Dept
    cc: Mike Foster/Dallas/IBM@IBMUS, Douglas Buster/Dallas/IBM@ibmus,
    Enrique Gomez/Austin/IBM, David Martin/Almaden/IBM@IBMUS, Vicki Wolf/
    Austin/Contr/IBM@IBMUS
    From: Julie Key/Austin/IBM@IBMUS
    Subject: IM4RM V1.3

I am pleased to announce that IM4RM V1.3 has gone GOLD. It will be shipped to Dallas
today so that they can verify and prepare this release for shipment to customers.

If you have questions concerning our release of this product, please let me know.

(Julie Key
juliekey@us.ibm.com                                                  604
IBM Data Mining – SW Dev Mgr, IM4RM

*FIG. 6B*

▽ Julie Key
12/16/98 04:35PM                                                                700
* * * * * * * * * * * * * * * * * *

To: staffers
cc: Mike Foster/Dallas/IBM@IBMUS, Douglas Buster/Dallas/IBM@ibmus,
Enrique Gomez/Austin/IBM, David Martin/Almaden/IBM@IBMUS, Victoria Wolf/
Austin/Contr/IBM@IBMUS From: Julie Key/Austin/IBM@IBMUS
Subject: IM4RM V1.3

I am pleased to announce that IM4RM V1.3 has gone GOLD. It will be shipped to Dallas today so that they can verify and prepare this release for shipment to customers.

If you have questions concerning our release of this product, please let me know.

(Vicki — please forward a copy of the Generic Consulting Proposal for IM4RM David Martin is preparing to all addressees of this memo.
See David about when it will be ready and let me know, please.)

Julie Key                                                    702
juliekey@us.ibm.com
IBM Data Mining – SW Dev Mgr, IM4RM

*FIG. 7A*

▽ Julie Key
12/16/98 04:35PM                                                                704
* * * * * * * * * * * * * * * * * *

To: staffers
cc: Mike Foster/Dallas/IBM@IBMUS, Douglas Buster/Dallas/IBM@ibmus,
Enrique Gomez/Austin/IBM, David Martin/Almaden/IBM@IBMUS, Victoria Wolf/
Austin/Contr/IBM@IBMUS From: Julie Key/Austin/IBM@IBMUS
Subject: IM4RM V1.3

I am pleased to announce that IM4RM V1.3 has gone GOLD. It will be shipped to Dallas today so that they can verify and prepare this release for shipment to customers.

If you have questions concerning our release of this product, please let me know.

Julie Key
juliekey@us.ibm.com
IBM Data Mining – SW Dev Mgr, IM4RM

*FIG. 7B*

▽ Julie Key
   12/16/98 04:35PM                                                    800
   * * * * * * * * * * * * * * * *

To: Developers
   cc: Vance Worthingly, Mike Foster/Dallas/IBM@IBMUS, Douglas Buster/Dallas/
   IBM@ibmus, David Martin/Almaden/IBM@IBMUS bcc: ⌐ Julie Key ¬ ~ 808

From: Julie Key/Austin/IBM@IBMUS
   Subject: IM4RM V1.3

I am pleased to announce that IM4RM V1.3 has gone GOLD. Congratulations on to all
   developers and testing staff on this magnificent piece of work!

If you have questions concerning our release of this product, please let me know.   802

┌─────────────────────────────────────────────────────────────────────────┐
   │ (Vance, I know this is tight timing, but please push on the developers to get the CD cut │
   │ and shipped to Dallas TODAY. Work with Doug and Mike in Dallas.)        │
   ├─────────────────────────────────────────────────────────────────────────┤
   │ (Doug, and Mike, I need you to get right on testing this release, because Mellon Bank │
   │ wants it on the 1st, and it could be a bit shaky since this is the first full-scale │
   │ integration testing. Work with Vance, please-- Thanks).                 │
   ├─────────────────────────────────────────────────────────────────────────┤
   │ (Self- don't forget to call Doug daily. Put this on my calendar.) ~ 806    804
   └─────────────────────────────────────────────────────────────────────────┘
   Julie Key
   juliekey@us.ibm.com
   IBM Data Mining - SW Dev Mgr, IM4RM

*FIG. 8A*

▽ Julie Key
   12/16/98 04:35PM                                                    810
   * * * * * * * * * * * * * * * *

To: Developers
   cc: Vance Worthingly, Mike Foster/Dallas/IBM@IBMUS, Douglas Buster/Dallas/
   IBM@ibmus, David Martin/Almaden/IBM@IBMUS
   bcc:

From: Julie Key/Austin/IBM@IBMUS
   Subject: IM4RM V1.3

I am pleased to announce that IM4RM V1.3 has gone GOLD. Congratulations on to all
   developers and testing staff on this magnificent piece of work!

Julie Key
   juliekey@us.ibm.com
   IBM Data Mining - SW Dev Mgr, IM4RM

*FIG. 8B*

▽ Julie Key
12/16/98 04:35PM                                                              812
* * * * * * * * * * * * * * * *

To: Developers
cc: Vance Worthingly, Mike Foster/Dallas/IBM@IBMUS, Douglas Buster/Dallas/
IBM@ibmus, David Martin/Almaden/IBM@IBMUS
bcc:

From: Julie Key/Austin/IBM@IBMUS
Subject: IM4RM V1.3

I am pleased to announce that IM4RM V1.3 has gone GOLD. Congratulations on to all developers and testing staff on this magnificent piece of work!

(Vance, I know this is tight timing, but please push on the developers to get the CD cut and shipped to Dallas TODAY. Work with Doug and Mike in Dallas.)

Julie Key                                                                       806
juliekey@us.ibm.com
IBM Data Mining — SW Dev Mgr, IM4RM

*FIG. 8C*

▽ Julie Key
12/16/98 04:35PM                                                              814
* * * * * * * * * * * * * * * *

To: Developers
cc: Vance Worthingly, Mike Foster/Dallas/IBM@IBMUS, Douglas Buster/Dallas/
IBM@ibmus, David Martin/Almaden/IBM@IBMUS
Bcc:

From: Julie Key/Austin/IBM@IBMUS
Subject: IM4RM V1.3

I am pleased to announce that IM4RM V1.3 has gone GOLD. Congratulations on to all developers and testing staff on this magnificent piece of work!

(Doug, and Mike, I need you to get right on testing this release, because Mellon Bank wants it on the 1st, and it could be a bit shaky since this is the first full-scale integration testing. Work with Vance, please-- Thanks).

Julie Key                                                                       804
juliekey@us.ibm.com
IBM Data Mining — SW Dev Mgr, IM4RM

*FIG. 8D*

METHOD AND APPARATUS FOR SENDING PRIVATE MESSAGES WITHIN A SINGLE ELECTRONIC MESSAGE

BACKGROUND OF THE INVENTION

1. Technical Field

The present invention relates to an improved data processing system and in particular to a method for sending messages. Still more particularly, the present invention relates to a method and apparatus for sending private messages to selected recipients from a single message.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of information, entertainment, and communications. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

In addition to being a source of information, the Internet also provides a communications medium. The Internet has become the most popular computer network used by consumers and businesses to send and receive electronic mail, also referred to as "e-mail". The Internet allows users to readily send and receive e-mail to and from computers around the world. Each user typically has a unique Internet e-mail address (e.g., steve@ibm.com). A user with an e-mail account and a computer capable of connecting to the Internet can easily send and receive e-mail over the network.

E-mail allows a person to quickly and easily send textual messages and other information, such as, for example, pictures, sound recordings, and formatted documents electronically to other e-mail users anywhere in the world. An e-mail user will typically create a message using an e-mail program running on a computer connected to a computer network through a modem. The message will include an e-mail "address" for the intended recipient. When the user has finished entering the message, the user may "send" the message to the intended recipient. The e-mail program then electronically transmits the message over the computer network. The recipient, using an e-mail program running on the recipient's computer, can then "receive" the message.

A user may send messages to multiple recipients through various fields, such as "TO:" and "CC:", in an e-mail program. When composing a message for a large group or recipients, the user may need to send a private message to a recipient within the group of recipients. In such an instance, the user generates a message for recipients within the group other than those that are to receive the private message. Then, the user generates another message for the recipient that is to receive a private message. If a second recipient within the group of recipients is to receive another private message, the user must generate yet another message. Such a process can be tedious and time consuming depending on the number of recipients that are to receive private messages.

Therefore, it would be advantageous to have an improved method and apparatus for sending private messages in an e-mail message.

SUMMARY OF THE INVENTION

The present invention provides a method, system, and program for use within a data processing system for sending messages. A plurality of recipients is identified for an electronic message. A number of different sections are designated within the electronic message for separate receipt by each of a number of recipients within the plurality of recipients. Responsive to an indication to send the electronic message, an electronic message is automatically generated for each of the number of recipients, wherein the message of a given recipient within the number of recipients excludes sections within the number of sections designated for other recipients within the number of recipients, i.e., involves only those sections within the number of sections identified for the given recipients.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A and 6B are examples of private messages processed depicted in accordance with a preferred embodiment of the present invention;

FIGS. 7A and 7B are additional examples of private message processing depicted in accordance with a preferred embodiment of the present invention;

FIGS. 8A–8D are examples of messages depicted in accordance with a preferred embodiment of the present invention;

DETAILED DESCRIPTION OF THE PREFERRED EMBODIMENT

Figure 1:
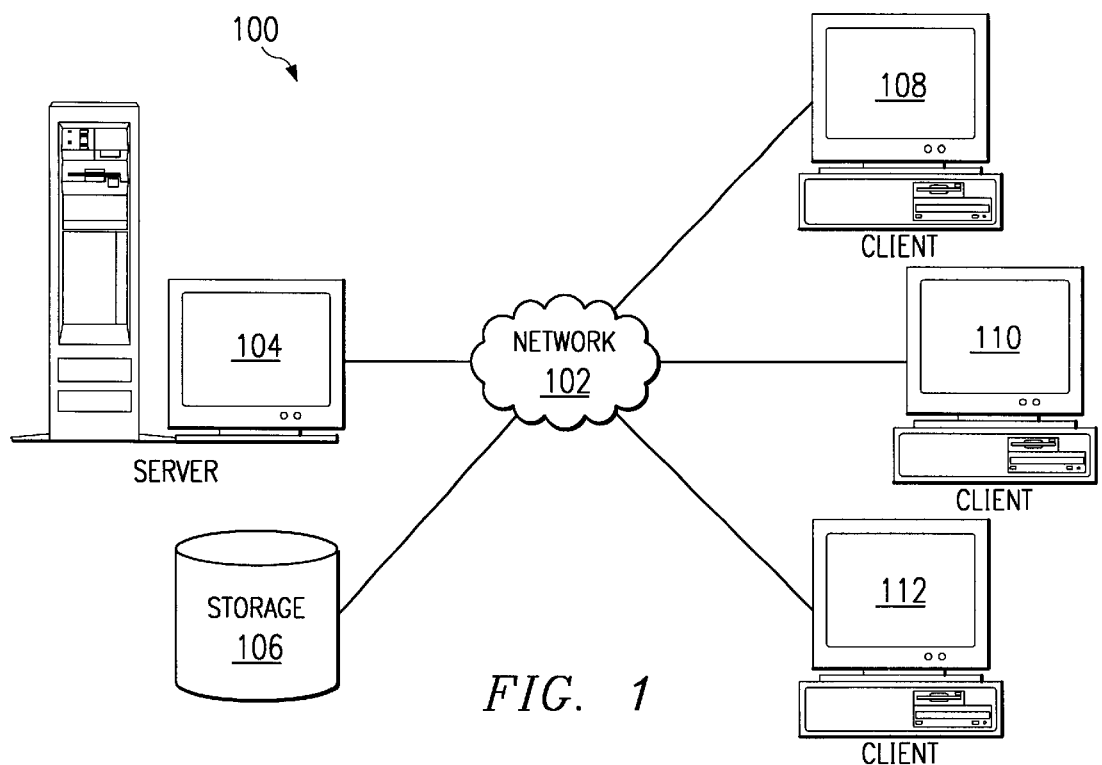
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. In the depicted examples, server 104 may contain an electronic mail system from which clients 108, 110, and 112 send and receive e-mail messages through e-mail programs or applications located on the clients. Distributed data processing system 100 may include additional servers, clients, and other devices not shown. For example, messages may be sent and received between server 104 and other servers (not shown) to distribute and receive messages from other clients (not shown).

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
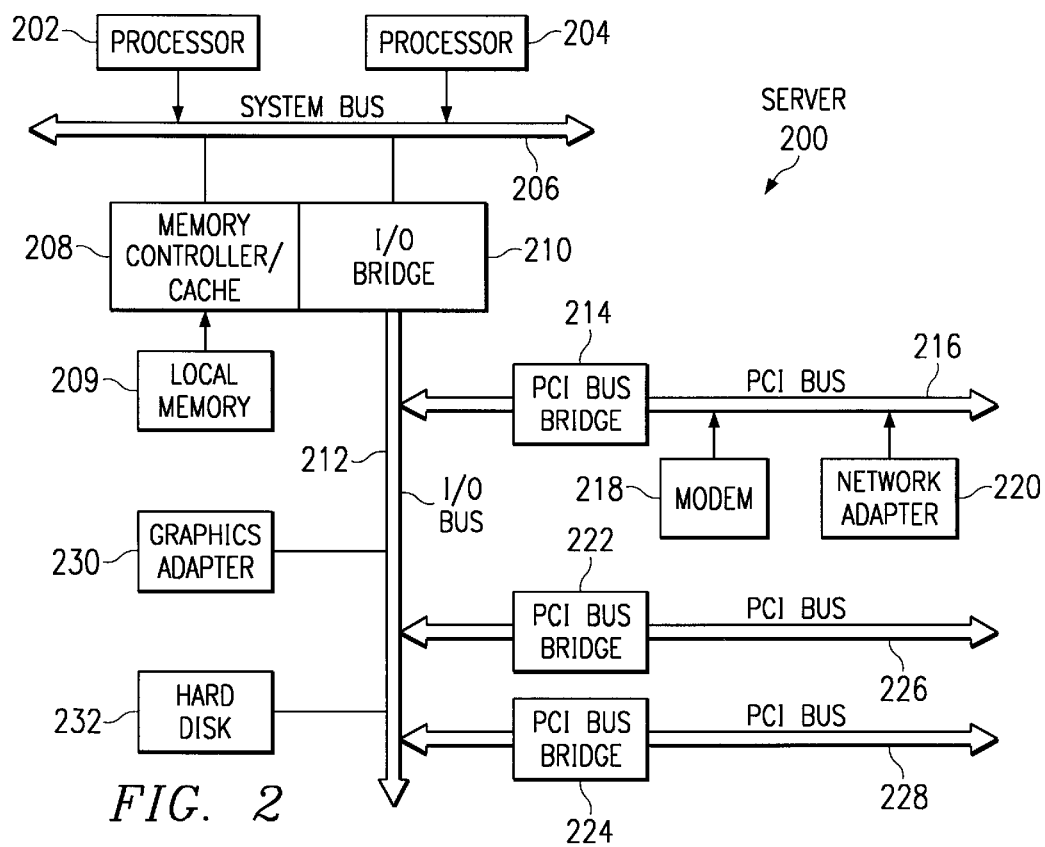
FIG. 2 is a block diagram depicting a data processing system that may be implemented as a server in accordance with a preferred embodiment of the present invention.

Referring to FIG. 2, a block diagram depicts a data processing system that may be implemented as a server, such as server 104 in FIG. 1, in accordance with a preferred embodiment of the present invention. In the depicted examples, data processing system 200 is used as an electronic mail message server providing service to a number of clients. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
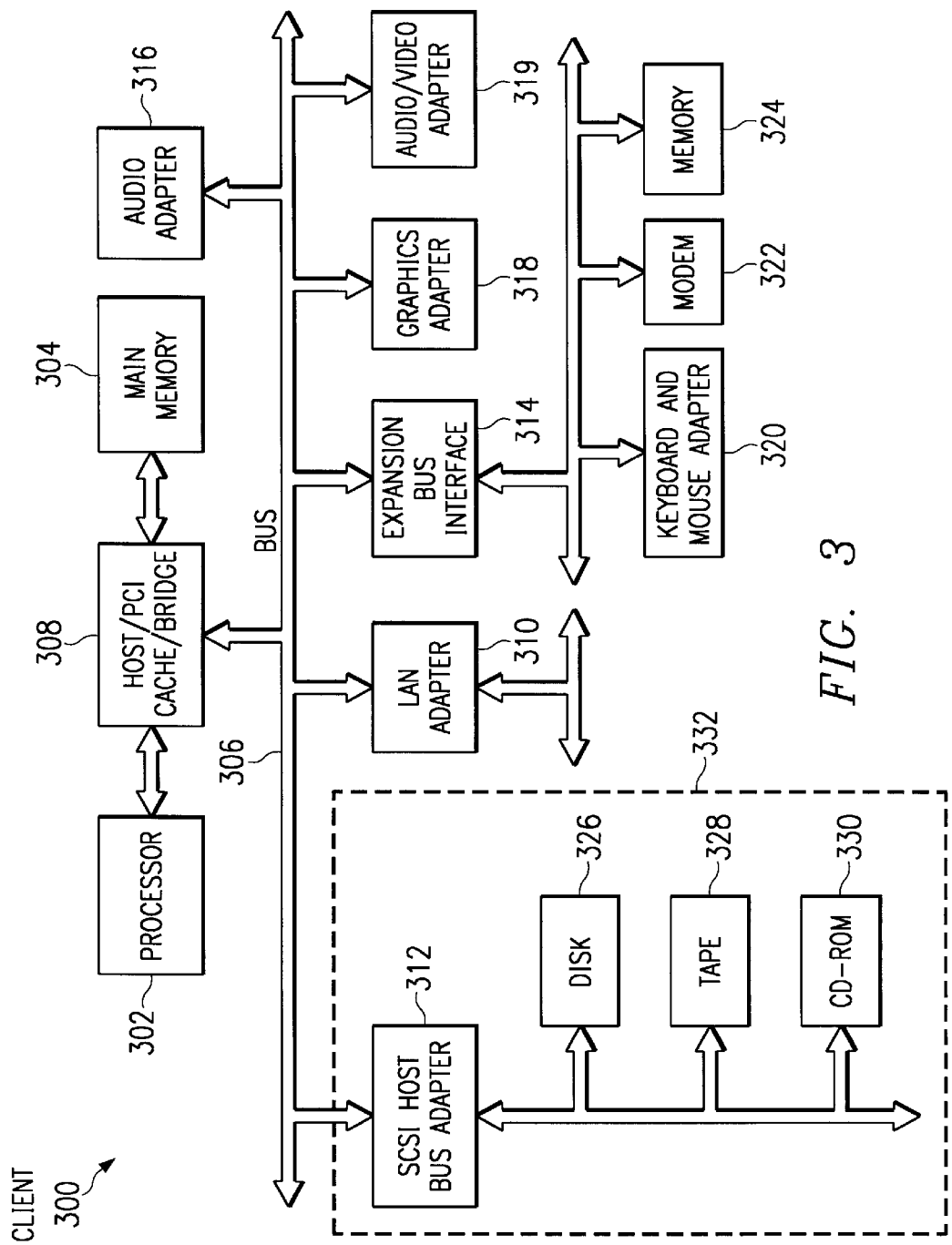
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. In these examples, data processing system 300 may include any mail program or application for generating, sending, and receiving messages. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

The present invention provides a method, apparatus, and instructions for customizing and addressing multiple messages within a single message editing session. At any time while composing a message, a user may address the message by entering individual recipients, or address list names in the message header using the message editor. The user may define a conditionally addressable message object through a number of mechanisms, such as, for example, setting color, font size, or font style, or any combination thereof. The mechanism to define a message object is called an object style. The depicted examples are illustrated using color as the object style. In the case in which color is used, each particular color may be associated with a particular address that is to receive the content marked with the color. The match between address color and message object color is used to determine which recipients receive which message objects. In the depicted example, uncolored text (black), hereafter referred to as base message text, is sent to all recipients by default.

Colored text in drawings, tables, images, and container-based documents are unaffected by the conditional message object selection. If color text has no effect, an overall style may be set to select drawings, tables, images, and container based documents to designate the documents. Content other than text also may be marked for sending to particular recipients. For example, attachments for documents or images and images within the message also may be selected for sending to particular recipients by marking the attachments or images with a color associated with the intended recipients.

To address or send a portion of a message, also referred to as a "message object", to a particular set of recipients, the user changes the color, font size, or style of these recipient names in the address fields of the message header to match message object color, font size, or style. In addition, any predefined address list may be opened via the distribution list expand command, such as distribution list expand command 504 in FIG. 5, to individually set the object style for individual members of the address list. The list may be presented, for example, via a pop-menu. Subsequent to the execution of the command, the command sets the address list object style to the object style of the last member of the address list that was changed. This change indicates that at least one address within the address list is targeted for a private message.

When the mail message is sent, different messages are sent to recipients with differently colored addresses. The recipients only see the base message text plus any message objects with the same colors as their addresses. Thus, a blue recipient receives the black base message text, plus any blue message objects, while a recipient whose name appears only in black in the address list receives only the base (black text) message. In the depicted examples, a recipient whose name appears in a black, bold font will receive the base text and all message objects.

When a mail message is received, all recipients in the To: and CC: list are shown, in the original colors selected. Recipients in the BCC: list are not shown, as is customary. Base text and conditionally addressed message object appears in color in received messages. Private message objects not addressed to the receiver are not included in the message at all, and as a result can never be viewed by someone to whom the message was not sent.

As a visual convenience, either sender or receiver may temporarily view message objects all in base text format (Arial black normal, by default) for ease of reading or turning colored message object on and off at will. The same function works for other object styles. For example, if message objects are in italics, then this command removes italics everywhere, replacing it with base text format. In addition either the sender or receiver may temporarily view the base and message objects for any addressed color by simply selecting an option on a menu. Any sender or resender may remove all message object definitions for resending, or may forward or edit message object color. The default should be to leave message objects colored. As mentioned above, other object styles other than color may be used. For example, font type or font size may be used. Also, a combination of color and font could be the object style.

Figure 4:
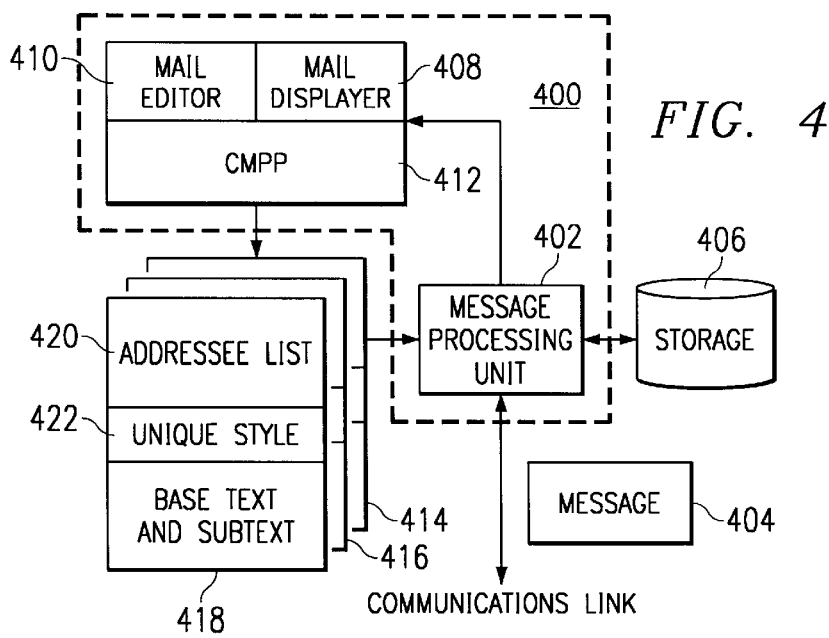
FIG. 4 is a block diagram of an e-mail program depicted in accordance with a preferred embodiment of the present invention.

With reference now to FIG. 4, a block diagram of an e-mail program is depicted in accordance with a preferred embodiment of the present invention. E-mail program 400 in this example includes a message processing unit 402 which processes messages, such as message 404, created and received by the user. Message processing unit 402 may be implemented by using currently available mail systems, such as Lotus Notes or CC Mail, which are available from Lotus Development Corporation. If message 404 is a message received by message processing unit 402, the message may be stored in storage 406.

Mail program 400 also includes mail displayer 408, which is a graphical user interface (GUI) that is used to display message 404. If the user edits or generates a message, these functions may be accomplished through mail editor 410. Further, mail program 400 includes a conditional message processing program (CMPP) 412, which includes the processes of the present invention used to generate content that is sent only to a selected recipient.

Using mail editor 410, a user composes a message using styled addresses and styled text in the body of the message. The object style may be any type of graphical indication, such as, for example, color, font type, or font size. One style is reserved (black, bold) to designate any address which should receive all message objects unconditionally. Mail editor 410 may be any editor, which allows CMPP 412 to read the style of each object. In the depicted examples, an object in a message, also referred to as a "message object", includes, for example, a paragraph, a heading, a drawing, a table, an image, or a container.

When the sender selects send or forward, CMPP 412 will read all recipient lists, such as, for example, TO:, CC:, or BCC:. CMPP 412 determines the number of unique recipient styles (i.e., fonts or colors) and creates outgoing message buffers 414–418 in memory or storage 406. An outgoing message buffer is created for each recipient style and is used to store content for a message for the particular recipient. CMPP 412 assigns each unique recipient style to a single buffer. CMPP 412 also makes a list of all recipients listed with that unique style and stores the list in an address list, such as address list 420 in outgoing message buffer 418. This address list 420 is used as the recipient list for outgoing message buffer 418. The styles, TO:, CC:, or BCC: properties of the recipient are preserved in the message header in unique style field 422 in outgoing message buffer 418.

CMPP 412 then reads the message from top to bottom, obtaining the type and style of each message object. If a message object has been marked as a global object, the message object is simply copied to all buffers for all recipients. Otherwise the object style of the object is read. If the object style of the object does not match any unique address style, the object is simply copied to all message buffers. If the style of the object matches a unique address style, then that object is copied to the buffer tagged with that style, preserving the object color, font, and style properties. When all message objects in the original message have been processed, CMPP 412 sends the content of each buffer as a separately addressed message, using message processing unit 402. In the depicted example the status of each mail message is processed by the message processing unit 402, not CMPP 412. The original message may be stored in storage 406 for review by the user.

Figure 5:
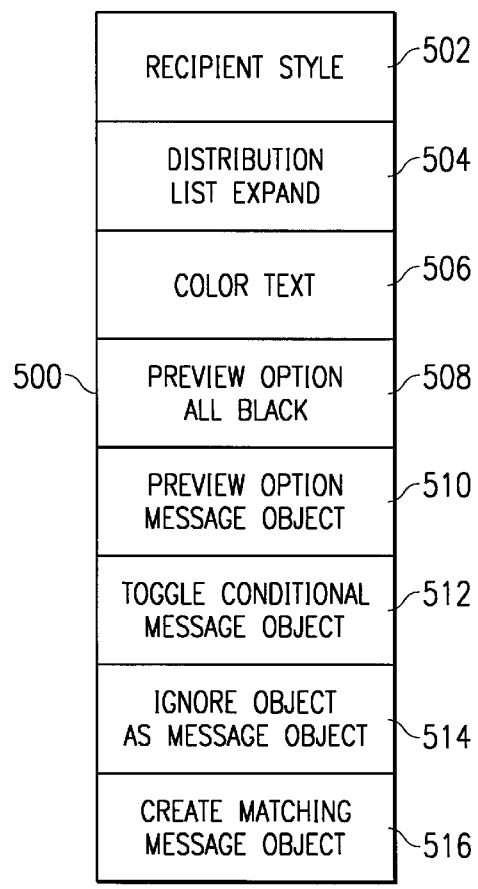
FIG. 5 is a diagram illustrating functions for processing e-mail messages depicted in accordance with a preferred embodiment of the present invention.

With reference now to FIG. 5, a diagram illustrating functions for processing e-mail messages is depicted in accordance with a preferred embodiment of the present invention. Table 500 illustrates various commands that may be employed by a user creating or editing a message. The commands illustrated in table 500 may be presented to a user in a number of ways. The commands may be accessed through a pull down menu or as a pop-up menu. Further, selected keyboard strokes or mouse buttons may be used to invoke different commands.

Recipient style 502 is a command used to set the style color, font, and font style of each recipient. When processed by a CMPP, such as CMPP 412 in FIG. 4 the text in fields TO:, CC:, or BCC: should have an object style set for each recipient to receive the selected text. This style is read by the CMPP at transmit time. Distribution list expand 504 is an option used to support conditional message object. If included, this command expands the distribution list into individual recipients, so that their conditional object styles can be set.

Color text 506 is a command used to set the style of message body text. It has the same requirements as recipient style above. Preview option in base text format 508 is a command that displays conditional text in black, normal type. Similar preview options may be used for other object styles. Preview option message object select 510 is a command to allow the user to preview a message for a single addressee. This option displays the base black text, plus any one style color, font, style for the addressee. This option simply redisplays the text, overriding any colors, other than the color, font, or style for the addressee, in the recipient box with black in the text. Included drawings, images, tables, and container-based objects are not affected by this command.

Toggle conditional message object 512 is a command that turns message object processing off (default) or on for messages. Usually a forwarded or reply-all message would include all message objects in original styles. However, a user may want to edit and forward a message with message object processing turned on. This command will result in recording the message object processing state off default, or on, for use by the CMPP. If message object processing is off, the message is sent without message object processing of any kind, and all recipients and message styles remain the same. If it is turned on, then the message object styles can be edited, and subsequent message object processing may generate multiple message texts, as usual.

Ignore object as message object 514 is a setup option used to determine which paragraph and object styles will not be processed as message objects. Normally, this option is set to include drawings, tables, images and containers. The list of ignored objects is simply recorded and made available to the conditional message processing program. The default should include common object names for drawings, tables, images and containers which contain objects which cannot be handled by the CMPP.

The create matching message object command 516 may be selected after highlighting the text. Double clicking the addressee changes the properties of the message object to match the addressee.

With reference now to FIGS. 6A and 6B, examples of private messages processed are depicted in accordance with a preferred embodiment of the present invention. The message includes a base or default color (black) that that will be included to any recipient of the message. Portions of the message in other colors will only be sent to recipients associated or designated by the color.

In FIG. 6A, message 600 is a message originated by a user, Julie Key, sent to a recipient, Vicki Wolf. Message 600 includes a message object 602 which is a message object with distribution instructions. In this example, message object 602 is displayed in red. In FIG. 6B message 604 is a forwarded message containing message 600 with message object 602 being excluded. When Vicki Wolf forwards the message, none of the recipients have been designated with the color red to identify the recipients as ones to receive message object 602.

Turning next to FIGS. 7A and 7B, another example of private message processing is depicted in accordance with a preferred embodiment of the present invention. In this example, user Julie Key composes a message for a staff distribution list with a copy to Vicki Wolf. Message 700 in FIG. 7A illustrates the message generated by the user and the message that would be viewed by Vicki Wolf. In this example, message object 702 is displayed in red. This message object is a private message intended only for Vicki Wolf and not to other recipients. In FIG. 7B, message 704 is an example of the message that would be received by other recipients. As can be seen, message object 702 is missing from message 704.

With reference to FIGS. 8A–8D, examples of messages are depicted in accordance with a preferred embodiment of the present invention. In this example, the message is composed in a base or default color, such as black. All recipients will receive the part of the message that is in the base or default color. Changing the color in the message from the base or default color to another color will result in the text containing the changed color being sent to a recipient or recipients associated with that color.

In FIG. 8A, message 800 is a message composed by user Julie Key in which the base text message is directed towards developers. Different message objects are directed towards recipients Vance Worthingly, Douglas Buster, and Mike Foster. Message object 802 in this example is in blue and designated for Vance Worthingly. Message object 804 is displayed in red and is designated for Douglas Buster and Mike Foster. Further, on this example, message object 806 is displayed in bold and designated for the sender Julie Key as placed in the BCC field 808. All of the recipients will receive the base message, but only the designated recipients will receive text objects that have been designated for them.

In FIG. 8B, message 810 is the message received by developers. The developers only receive the base message and none of the message objects. In FIG. 8C, message 812 is the message received by Vance Worthingly and includes message object 806 from message 800 composed by Julie Key. In FIG. 8D, Douglas Buster and Mike Foster both receive message 814, which includes message object 804. These two recipients, however, do not receive the other message objects because they have been designated for other recipients.

Figure 9:
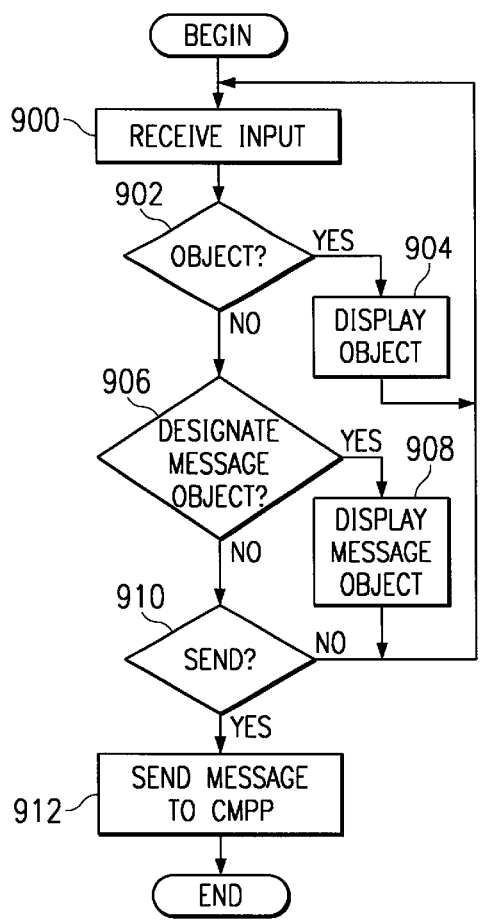
FIG. 9 is a flowchart of a process for editing and designating objects depicted in accordance with a preferred embodiment of the present invention.

With reference now to FIG. 9, a flowchart of a process for editing and designating objects is depicted in accordance with a preferred embodiment of the present invention. The processes in FIG. 9 may be implemented using a text editor. The process begins by receiving user input (step 900). This user input may take various forms including, for example, text or selection of text for an object. A determination is made as to whether an object is to be created (step 902). If the determination is yes, the object is placed in a message and displayed (step 904) with the process returning to step 900. Otherwise, a determination is made as to whether the user input is a designation of a message object (step 906). This designation may be, for example, a group of text, an image, or an attachment. In the depicted examples, the designation is made by changing the color of the message object from the base or default color to another color.

If the user has designated a message object, the message object is displayed (step 908) with the process then returning to step 900. Otherwise, a determination is made as to whether the user input is to send the message (step 910). If the user input is to send the message, the message is sent to the CMPP (step 912) with the process terminating thereafter. Otherwise, the process returns to step 900.

Figure 10:
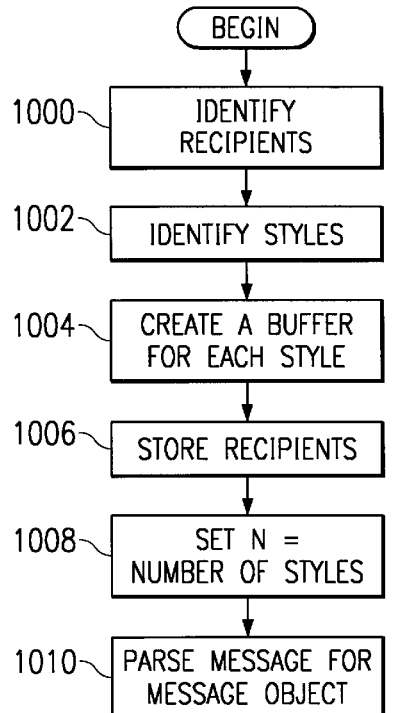
FIG. 10 is a flowchart of a process used to generate messages for recipients from a single message depicted in accordance with a preferred embodiment of the present invention.

With reference now to FIG. 10, a flowchart of the CMPP process used to generate messages for recipients from a single message is depicted in accordance with a preferred embodiment of the present invention. The process in FIG. 10 is initiated when the user has completed composing or editing a message and has decided to send the message. The process begins by identifying recipients (step 1000). Thereafter, styles are identified (step 1002). This step may be accomplished in a number of ways. For example, the recipient fields may be parsed to determine whether any of the recipients have been designated through a change in color from a base or default color. The default or base style is always present and additional styles may be present depending on designations made by the user. Alternatively, a list of recipients may be checked to determine if any of the recipients are unique recipients associated with a style that are to receive designated portions of the message.

Thereafter, an outgoing message buffer is created for each style (step 1004). Each recipient for a message style is stored within a list in the outgoing message buffer created for the style (step 1006). The identification of the style also is stored within the outgoing message buffer for the style. The message buffers are used to create a message for each unique addressee object style. These buffers also include a single buffer for a default style for recipients that will only receive the base message, identified by the base or default color.

A variable N is set equal to the number of unique styles identified (step 1008). Thereafter, the message is parsed for a message object to process (step 1010). A determination is then made as to whether an unprocessed message object is present (step 1012). If an unprocessed message object is present for processing, an index i is set equal to zero (step 1014). This index i is used as an index to identify styles for processing. The unprocessed message object is selected for processing (step 1016). Then, style i is compared to the style of the message object (step 1018). A determination is then made as to whether a match between style i and the message object is present (step 1020). If a match is present, the message object is copied to the buffer for style i (step 1002) with the process then returning to step 1012.

If a match is not present, i is incremented by one (step 1024). A determination is then made as to whether i is equal to N (step 1026). If i is not equal to N, the process returns to step 1018. Otherwise, the process returns to step 1012 to determine whether additional message objects are present for processing. If no additional unprocessed message objects are present, the messages in the outgoing message buffers are sent to a message processing unit 402 for distribution to the recipients (step 1028) with the process terminating thereafter.

Thus, the present invention allows for associating a public message with a private message avoiding addressing two messages to each recipient, one public and one private; and avoiding having to cross reference the private message to the public message. It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for sending messages, the method comprising the data processing system implemented steps of:

identifying a plurality of recipients for a message;

designating a portion of the message for receipt by a designated recipient within the plurality of recipients; and responsive to an indication to send the message, automatically generating a first electronic message for the plurality of recipients, wherein the designated portion of the message is absent from the first electronic message; and responsive to the indication to send the message, automatically generating a second message for the designated recipient, wherein the second message includes the designated portion of the electronic message.

2. The method of claim 1, wherein the step of identifying comprises receiving the plurality of recipients as an input.

3. The method of claim 1, wherein the step of identifying comprises identifying the plurality of recipients previously designated for the electronic message.

4. The method of claim 1, wherein the portion of the message is designated by setting a color for the portion of the message.

5. The method of claim 1, wherein the message is text and wherein the text of the message is in a first font and wherein the portion of the message is designated by selecting a second font for the portion of the message.

6. The method of claim 1, wherein the message includes an image and wherein the image is designated by highlighting the image.

7. A method in a data processing system for sending messages, the method comprising the data processing system implemented steps of:

identifying a plurality of recipients for an electronic message;

designating a number of sections within the electronic message for receipt by a number of recipients within the plurality of recipients; and responsive to an indication to send the electronic message, automatically generating an electronic message for each of the number of recipients, wherein the message of a recipient within the number of recipients excludes sections within the number of sections designated for other recipients within the number of recipients.

8. The method of claim 7, wherein the electronic message includes a base section that is included in the electronic message of each of the number of recipients.

9. The method of claim 7, wherein the number of recipients is the plurality of recipients.

10. The method of claim 7, wherein the designating step comprises:

associating each section within the number of sections with a color associated with a recipient within the number of recipients.

11. The method of claim 7, wherein the designating step comprises:

associating each section within the number of sections with a font associated with a recipient within the number of recipients.

12. The method of claim 7, wherein the number of recipients is a portion of the plurality of recipients.

13. A data processing system for sending messages, the data processing system comprising:

identifying means for identifying a plurality of recipients for a message;

designating means for designating a portion of the message for receipt by a designated recipient within the plurality of recipients; and first generating means, responsive to an indication to send the message, for automatically generating a first electronic message for the plurality of recipients, wherein the designated portion of the message is absent from the first electronic message; and second generating means, responsive to the indication to send the message, for automatically generating a second message for the designated recipient, wherein the second message includes the designated portion of the electronic message.

14. The data processing system of claim 13, wherein the identifying means comprises receiving the plurality of recipients as an input.

15. The data processing system of claim 13, wherein the identifying means comprises identifying the plurality of recipients previously designated for the electronic message.

16. The data processing system of claim 13, wherein the portion of the message is designated by setting a color for the portion of the message.

17. The data processing system of claim 13, wherein the message is text and wherein the text of the message is in a first font and wherein the portion of the message is designated by selecting a second font for the portion of the message.

18. The data processing system of claim 13, wherein the message includes an image and wherein the image is designated by highlighting the image.

19. A data processing system for sending messages, the data processing system comprising:

identifying means for identifying a plurality of recipients for an electronic message;

designating means for designating a number of sections within the electronic message for receipt by a number of recipients within the plurality of recipients;

generating means, responsive to an indication to send the electronic message, for automatically generating an electronic message for each of the number of recipients, wherein the message of a recipient within the number of recipients excludes sections within the number of sections designated for other recipients within the number of recipients.

20. The data processing system of claim 19, wherein the electronic message includes a base section that is included in the electronic message of each of the number of recipients.

21. The data processing system of claim 19, wherein the number of recipients is the plurality of recipients.

22. The data processing system of claim 19, wherein the designating means comprises:

associating means for associating each section within the number of sections with a color associated with a recipient within the number of recipients.

23. The data processing system of claim 19, wherein the designating means comprises:

associating means for associating each section within the number of sections with a font associated with a recipient within the number of recipients.

24. The data processing system of claim 19, wherein the number of recipients is a portion of the plurality of recipients.

25. A computer program product in a computer readable medium for sending messages, the computer program product comprising:

first instructions for identifying a plurality of recipients for a message;

second instructions for designating a portion of the message for receipt by a designated recipient within the plurality of recipients; and third instructions, responsive to an indication to send the message, for automatically generating a first electronic message for the plurality of recipients, wherein the designated portion of the message is absent from the first electronic message; and fourth instructions, responsive to the indication to send the message, for automatically generating a second message for the designated recipient, wherein the second message includes all of the electronic message.

26. A computer program product in a computer readable medium for sending messages, the computer program product comprising:

first instructions for identifying a plurality of recipients for an electronic message;

second instructions for designating a number of sections within the electronic message for receipt by a number of recipients within the plurality of recipients;

third instructions, responsive to an indication to send the electronic message, for automatically generating an electronic message for each of the number of recipients, wherein the message of a recipient within the number of recipients excludes sections within the number of sections designated for other recipients within the number of recipients.

* * * * *